US007233943B2

(12) United States Patent
Modha et al.

(10) Patent No.: US 7,233,943 B2
(45) Date of Patent: Jun. 19, 2007

(54) CLUSTERING HYPERTEXT WITH APPLICATIONS TO WEB SEARCHING

(75) Inventors: Dharmendra Shantilal Modha, San Jose, CA (US); William Scott Spangler, San Martin, CA (US)

(73) Assignee: International Business Machines Corporation, Armonk, NY (US)

( * ) Notice: Subject to any disclaimer, the term of this patent is extended or adjusted under 35 U.S.C. 154(b) by 477 days.

(21) Appl. No.: 10/660,242

(22) Filed: Sep. 11, 2003

(65) Prior Publication Data

US 2004/0049503 A1    Mar. 11, 2004

Related U.S. Application Data

(62) Division of application No. 09/690,854, filed on Oct. 18, 2000, now Pat. No. 6,684,205.

(51) Int. Cl.
G06F 17/30 (2006.01)
G06F 7/00 (2006.01)

(52) U.S. Cl. .............................. 707/3; 707/10; 715/513

(58) Field of Classification Search .................... 707/2, 707/3, 5, 6, 10, 104.1, 4; 715/513, 501.1, 715/532
See application file for complete search history.

(56) References Cited

U.S. PATENT DOCUMENTS

| 5,787,420 | A | 7/1998 | Tukey et al. ................... 707/5 |
| 5,787,421 | A | 7/1998 | Nomiyama ................... 707/5 |
| 5,819,258 | A | 10/1998 | Vaithyanathan et al. ....... 707/2 |
| 5,835,905 | A | 11/1998 | Pirolli et al. ................... 707/3 |
| 5,857,179 | A | 1/1999 | Vaithyanathan et al. ....... 707/2 |
| 5,864,845 | A | 1/1999 | Voorhees et al. .............. 707/5 |
| 5,895,470 | A * | 4/1999 | Pirolli et al. ................. 707/102 |
| 5,920,859 | A | 7/1999 | Li ................................. 707/5 |
| 6,012,058 | A | 1/2000 | Fayyad et al. ................. 707/6 |
| 6,038,574 | A | 3/2000 | Pitkow et al. .............. 715/513 |
| 6,115,708 | A | 9/2000 | Fayyad et al. ................. 707/6 |
| 6,122,647 | A | 9/2000 | Horowitz et al. ........... 715/513 |
| 6,256,648 | B1 | 7/2001 | Hill et al. ................. 715/501.1 |
| 6,298,174 | B1 | 10/2001 | Lantrip et al. .............. 382/305 |
| 6,363,379 | B1 | 3/2002 | Jacobson et al. .............. 707/5 |
| 6,389,436 | B1 * | 5/2002 | Chakrabarti et al. ........ 715/513 |
| 6,460,036 | B1 | 10/2002 | Herz ........................... 707/10 |
| 6,556,983 | B1 | 4/2003 | Altschuler et al. ............ 706/55 |
| 6,684,205 | B1 * | 1/2004 | Modha et al. .................. 707/3 |
| 6,862,586 | B1 * | 3/2005 | Kreulen et al. ................ 707/3 |

OTHER PUBLICATIONS

Kuo et al., Web Document Classification based on Hyperlinks and Document Semantics, Aug. 2000, PRICAI 2000 Workshop on Text and Web Mining, pp. 44-51.*

(Continued)

*Primary Examiner*—Jeffrey Gaffin
*Assistant Examiner*—Jacques Veillard
(74) *Attorney, Agent, or Firm*—Gibb I.P. Law Firm, LLC; Marc McSwain, Esq.

(57) ABSTRACT

A method of searching a database of documents, wherein the method includes performing a search of the database using a query to produce query result documents; constructing a word dictionary of words within the query result documents; constructing an out-link dictionary of documents within the database that are pointed to by the query result documents; adding the query result documents to the out-link dictionary; constructing an in-link dictionary of documents within the database that point to the query result documents; and adding the query result documents to the in-link dictionary.

20 Claims, 8 Drawing Sheets

OTHER PUBLICATIONS

Pirolli et al., Silk from a Sow's Ear: Extracting Usable Structures from the Web, 1996, CHI, pp. 1-9.*

Terveen et al., Constructing, Organizing, and Visualizing Collections of Topically Related Web Resources, 1999, AT&T, pp. 67-94.*

Chakrabarti et al., Enhanced hypertext categorization using hyperlinks, 1998, ACM, pp. 307-318.*

Modha et al., Clustering Hypertext with Applications to Web Searching, 2000, ACM, pp. 143-152.*

Gurrin et al., A Connectivity Analysis Approach to Increasing Precision in Retrieval from Hyperlinked Documents, pp. 1-10.*

Neville et al., Clustering Relational Data Using Attribute and Link Information, pp. 1-6.*

Sougata Mukherjea, Organizing Topic-Specific Web Information, pp. 133-141.*

Chen, "Structuring and Visualizing the WWW by Generalised Similarity Analysis", In proceedings of Hypertext, 1997, pp. 177-186.

Foley et al, "Interactive Clustering for Navigating in Hypermedia Systems", ACM Press, 1994, pp. 136-145.

Modha et al., "Concept Decompositions for Large Sparse Text Data Using Clustering", 1999, pp. 1-32.

Silverstein et al., "Analysis of a Very Large Alta Vista Query Log", SRC Technical Note 26, 1998, pp. 1-17.

Chakrabarti, S., Dom, B., Indyk, P., "Enhanced Hypertext Categorization Using Hyperlinks", ACM Sigmond 1998, Seattle, Washington, pp. 1-12.

Kleinberg, Jon M., "Authoritative Sources in a Hyperlinked Environment", Proceedings of the ACM-SIAM Symposium on Discrete Algorithms, 1998, IBM Research Report RJ 10076, May 1997, pp. 1-33.

Lawrence, Steve and Giles, C. Lee, "Searching the World Wide Web", Science, vol. 280, Apr. 3, 1998, pp. 98-100.

Larson, Ray R., "Bibliometrics of the World Wide Web: An Exploratory Analysis of the Intellectual Structure of Cyberspace", Proceeding of the 1996 American Society for Information Science Annual Meeting, pp. 1-13.

Chakrabarti, S., Dom, B., Raghavan, P., Rajagopalan, S., Gibson, D., Kleinberg, J., "Automatic Resource Compilation by Analyzing Hyperlink Structure and Associated Text", WWW7, 1998, pp. 1-14.

Bradley, P.S. and Fayyad, Usama M., "Refining Initial Points for K-Means Clustering", ICML, 1998, pp. 91-99.

Chakrabarti, S., Dom, B.E., Kumar, S.R., Raghayan, P., Rajagopalan, S., Tomkins, A., Kleinberg, J.M., and Gibson, D., "Hypersearching the Web", Scientific American, Jun. 1999, pp. 1-8.

Weiss, R., Velez, B., Sheldon, M.A., Namprempre, C., Szilagyi, P., Duda, A., Gifford, D.K., "Hypursuit: A Hierarchical Network Search Engine that Exploits Content-Link Hypertext Clustering", ACM Hypertext, 1996, pp. 180-193.

Mukherjea, S., Foley, J.D., Hudson, S.E., "Interactive Clustering for Navigating in Hypermedia Systems", ACM Hypertext, Sep. 1994, pp. 136-145.

Chen, C., "Structuring and Visualising the Web by Generalised Similarity Analysis", ACM Hypertext, 1997.

Pirolli, P., Pitkow, J., Rao, R., "Silk from A Sow's Ear: Extracting Usable Structures from the Web" ACM, SIGCHI Human Factors Comput., 1996.

Chen, C., Czerwinski, M., "From Latent Semantics to Spatial Hypertex—An Integrated Approach", ACM Hypertext, 1998, pp. 77-86.

Botafogo, R.A., "Cluster Analysis for Hypertext Systems", ACM-SIGIR Jun. 1993, pp. 116-125.

Rasmussent, E., "Clustering Algorithms", Information Regrieval: Data Structures and Processes, 1992, pp. 419-442.

Hartigan, "Clusterin Algorithms," Wiley Publication, Chapter 4, 1975, pp. 84-107.

P. Willet, "Recent Trends in Hierarchic Document Clustering", Inform. Proc. & Management, 1988, pp. 577-597.

Frakes et al., "Information Retrieva:1 Data Structures & Algorithms", Clustering Algorithms, Chapter 16, 419-442, 1992.

Chen et al., "From LatexSemantics to Spatial Hypertext An Integrated Approach", In Proceedings of Hypertext, 1998, pp. 77-86.

Weiss et al., "Hy Pursuit: A Hierarchial Network Search Engine that Exploits Content-Link Hypertext Clustering," In Proc. of Hypertext, 1996, pp. 180-193.

* cited by examiner

| query | $n$ | $d^o$ | $d$ | $d^o$ | $n_d$ | $f^o$ | $f$ | $f^o$ | $n_f$ | $\hat{n}_f$ | $b^o$ | $b$ | $b^o$ | $n_b$ | $\hat{n}_b$ |
|---|---|---|---|---|---|---|---|---|---|---|---|---|---|---|---|
| latex | 148 | 7059 | 2706 | 100.3 | 148 | 922 | 92 | 3.2 | 55 | 11 | 585 | 28 | 1.4 | 45 | 7 |
| abortion | 156 | 6205 | 2670 | 101.6 | 156 | 1286 | 144 | 3.3 | 67 | 10 | 662 | 58 | 1.8 | 64 | 9 |
| guinea | 146 | 6600 | 2814 | 100.0 | 146 | 1392 | 351 | 17.8 | 67 | 12 | 585 | 54 | 1.9 | 70 | 6 |
| abduction | 155 | 5967 | 2643 | 97.2 | 155 | 677 | 81 | 3.2 | 46 | 9 | 378 | 38 | 2.6 | 40 | 6 |
| virus | 146 | 6118 | 2627 | 111.6 | 146 | 2601 | 765 | 20.5 | 95 | 18 | 1191 | 100 | 3.8 | 70 | 14 |
| "human rights" | 157 | 7314 | 2800 | 113.6 | 157 | 1446 | 204 | 4.6 | 77 | 14 | 1369 | 99 | 2.9 | 71 | 12 |
| dilbert | 164 | 4584 | 1934 | 74.8 | 164 | 1257 | 173 | 3.8 | 80 | 4 | 385 | 15 | 1.3 | 45 | 5 |
| terrorism | 154 | 9824 | 4493 | 208.5 | 154 | 1762 | 242 | 6.1 | 74 | 18 | 675 | 47 | 2.0 | 51 | 14 |

FIG. 3

| | query: virus, Cluster 1, size = 146 |
|---|---|
| Keywords | virus,anti,software,information,computer,update |
| Summary | Anti-Virus Tools (51) |
| Review | SARC Virus EncyclopediaQ - Qm (19) |
| Breakthrough | SARC Virus EncyclopediaXn - Xz (26) |
| Reference | McAfee.com - The Place for Your PC |
| Citation | Zaujimave linky |

| | query: "human rights," Cluster 1, size = 157 |
|---|---|
| Keywords | human,international,unit,information,nation,report |
| Summary | Links to Other Human Rights Sources (40) |
| Review | Derechos Human Rights - contact info (59) |
| Breakthrough | United Nations Human Rights Website (22) |
| Reference | Derechos - Human Rights |
| Citation | HUMAN RIGHTS REPORTING: Primary Web... |

| | query: dilbert, Cluster 1, size = 165 |
|---|---|
| Keywords | adam,book,scott,comic,work,dogbert |
| Summary | DILBERT ZONE - scott adams past ... (129) |
| Review | DILBERT ZONE - dnrc sock puppets (103) |
| Breakthrough | July 1995: [BUBBA-L:26422]Re: Dilbert (121) |
| Reference | Dilbert Zone |
| Citation | Dilbert: On the Net 700 Sites! |

| | query: terrorism, Cluster 1, size = 154 |
|---|---|
| Keywords | terrorist,state,international,attack,bomb,security |
| Summary | US Policy on Terrorism..Part I* (21) |
| Review | Terrorism Research Center: Counterterrorist ... (34) |
| Breakthrough | Terrorism Research Center: Terrorist Profiles (28) |
| Reference | http://www.state.gov/www/global/terrorism/ |
| Citation | Terrorism - U.S. News Net Links (116) |

FIG. 4

| $\alpha_d$ | $\alpha_f$ | $\alpha_b$ | $Q_d$ | $Q_f$ | $Q_b$ | $T$ |
|---|---|---|---|---|---|---|
| 0.990 | 0.010 | 0.000 | 4.20 | 4.40 | 3.13 | 58.18 |
| 0.010 | 0.990 | 0.000 | 3.61 | 6.45 | 3.24 | 75.65 |
| 0.010 | 0.000 | 0.990 | 3.92 | 5.92 | 10.09 | 234.94 |
| 0.010 | 0.495 | 0.495 | 3.73 | 11.35 | 7.40 | 314.55 |

| query | $k$ | $\Delta$ | $\alpha_d^\dagger$ | $\alpha_f^\dagger$ | $\alpha_b^\dagger$ |
|---|---|---|---|---|---|
| latex | 2 | $\Delta_1$ | 0.010 | 0.000 | 0.990 |
| abduction | 2 | $\Delta_1$ | 0.495 | 0.010 | 0.495 |
| guinea | 3 | $\Delta_0$ | 0.010 | 0.495 | 0.495 |
| abortion | 3 | $\Delta_0$ | 0.010 | 0.495 | 0.495 |

| | |
|---|---|
| Keywords | query: latex, Cluster 1, size = 82 |
| | latex,glove,request,allergy,balloon,rubber |
| Summary | Latex Allergy Injuries - The Law Offices (122) |
| Review | Enlanger Latex Mattresses - 1(800)FloBeds(188) |
| Breakthrough | Latex Allergy Injuries - The Law Offices (122) |
| Reference | www.FloBeds.com 1(800)FloBeds |
| Citation | LATEX ALLERGY |

| | |
|---|---|
| Keywords | query: latex, Cluster 2, size = 66 |
| | tex,document,package,command,math,postscript |
| Summary | Intro to TeX;LaTeX;BibTeX and SliTeX (78) |
| Review | TeX and LaTeX (1) |
| Breakthrough | Peters TeX/LaTeX/LaTeX2e/LaTeX3 Page (38) |
| Reference | TeX Frequently Asked Questions |
| Citation | PROGRAMMING: bookmarks |

| | |
|---|---|
| Keywords | query: guinea, Cluster 1, size = 92 |
| | papua,country,png,weather,service,unit |
| Summary | Papua New Guinea Map (91) |
| Review | Weather ... Papua New Guinea Forecast. (17) |
| Breakthrough | @datec ... Papua New Guinea (46) |
| Reference | @datec Internet - Papua New Guinea |
| Citation | PAPUA NEW GUINEA ORCHID NEWS |

| | |
|---|---|
| Keywords | query: abduction, Cluster 1, size = 85 |
| | alien,ufo,story,experience,hip,generator |
| Summary | Wiendog's Alien Abduction Page (192) |
| Review | What is an alien abduction experience? (116) |
| Breakthrough | Alien Abduction Experience and Research (60) |
| Reference | ABIOGENESIS - POWER OF CREATION |
| Citation | Orthopaedic Rehabilitation, Abduction Pillows(141) |

| | |
|---|---|
| Keywords | query: abduction, Cluster 2, size = 71 |
| | child,children,parent,international,information,court |
| Summary | England & Wales - International ... Abduction (58) |
| Review | A Halloweed Abduction prevention page (105) |
| Breakthrough | Iran - International Parental Child Abduction (159) |
| Reference | Islamic Family Law - International ... Abduction (3) |
| Citation | Child Abduction - Divorce Support Net Links |

| | |
|---|---|
| Keywords | query: abortion, Cluster 1, size = 72 |
| | life,pro,birth,partial,issue,request |
| Summary | Abortion (OU CALL)[79] |
| Review | Medical Misinformation About Abortion (103) |
| Breakthrough | Resource: Abortion-A Decision for Death (64) |
| Reference | National Right to Life Committee Main Page |
| Citation | http://www.learnusa.org/articles/ |

FIG. 8A

| | query: guinea, Cluster 2, size = 34 |
|---|---|
| Keywords | pig,pigs,request,cavy,nance,live |
| Summary | Guinea Pig Links (196) |
| Review | Todd's Guinea Pig Hutch (6) |
| Breakthrough | Greg's Guinea Pigs (40) |
| Reference | Todd's Guinea Pig Hutch (6) |
| Citation | OinkerNet & Guinea Pigs Worldwide! |

| | query: guinea, Cluster 3, size = 20 |
|---|---|
| Keywords | bissau,travel,information,embassy,island,world |
| Summary | Guinea Bissau @ Travel Notes (t). (70) |
| Review | Papua New Guinea @ travel Notes (t). (160) |
| Breakthrough | Guinea-Bissau; with National Anthem... (23) |
| Reference | Country Information @ ... Online Travel Guide. |
| Citation | National Anthems of the World. |

| | query: abortion, Cluster 2, size = 45 |
|---|---|
| Keywords | women,cancer,baby,pregnancy,breast,heal |
| Summary | Project Rachel; Post-Abortion Healing ... (21) |
| Review | Abortion; The Pontifical Academy for Life (135) |
| Breakthrough | Ohio Abortion Statistics (102) |
| Reference | Life Institute-Proclaiming The Gospel of Life ... |
| Citation | Abortion references, Statistics; Study; Research ... |

| | query: abortion, Cluster 3, size = 39 |
|---|---|
| Keywords | reproductive,action,error,clinic,information,caral |
| Summary | California Abortion & Reproductive (CARAL) (138) |
| Review | California Abortion & Reproductive (CARAL) (35) |
| Breakthrough | China: Abortion (43) |
| Reference | Reproductive Health & Rights Center: Home Page |
| Citation | Dr. Frankloff's Gyn Web Library - Abortion |

FIG. 8B

CLUSTERING HYPERTEXT WITH APPLICATIONS TO WEB SEARCHING

CROSS-REFERENCE TO RELATED APPLICATIONS

This application is a division of U.S. application Ser. No. 09/690,854 filed Oct. 18, 2000, now U.S. Pat. No. 6,684,205 the complete disclosure of which, in its entirety, is herein incorporated by reference.

BACKGROUND OF THE INVENTION

1. Field of the Invention

The present invention generally relates to search programs and more particularly to an improved method and system for searching which clusters hypertext documents.

2. Description of the Related Art

The World-Wide-Web has attained a gargantuan size (Lawrence, S., and Giles, C. L. Searching the World Wide Web. Science 280, 5360 (1998), 98., incorporated herein by reference) and a central place in the information economy of today. Hypertext is the lingua franca of the web. Moreover, scientific literature, patents, and law cases may be thought of as logically hyperlinked. Consequently, searching and organizing unstructured collections of hypertext documents is a major contemporary scientific and technological challenge.

Given a "broad-topic Query" (Kleinberg, J. Authoritative sources in a hyperlinked environment, in ACM-SIAM SODA (1998), incorporated herein by reference), a typical search engine may return a large number of relevant documents. Without effective summarization, it is a hopeless and enervating task to sort through all the returned documents in search of high-quality, representative information resources. Therefore, there is a need for an automated system that summarizes the large volume of hypertext documents returned during internet searches.

SUMMARY OF THE INVENTION

It is, therefore, an object of the present invention to provide a structure and method for searching a database of documents comprising performing a search of the database using a query to produce query result documents, constructing a word dictionary of words within the query result documents, pruning function words from the word dictionary, forming first vectors for words remaining in a word dictionary, constructing an out-link dictionary of documents within the database that are pointed to by the query result documents, adding the query result documents to the out-link dictionary, pruning documents from the out-link dictionary that are pointed to by fewer than a first predetermined number of the query result documents, forming second vectors for documents remaining in the out-link dictionary, constructing an in-link dictionary of documents within the database that point to the query result documents, adding the query result documents to the in-link dictionary, pruning documents from the in-link dictionary that point to fewer than a second predetermined number of the query result documents, forming third vectors for documents remaining in the in-link dictionary, normalizing the first vectors, the second vectors, and the third vectors to create vector triplets for document remaining in the in-link dictionary and the out-link dictionary, clustering the vector triplets using the following four step process of the toric k-means process:

(a) arbitrarily segregate the vector triplets into clusters,
(b) for each cluster, computing a set of concept triplets describing the cluster,
(c) re-segregate the vector triplets into more coherent set of clusters obtained by putting each vector triplet into the cluster corresponding to the concept triplet that is closest to, that is, most similar to, the given vector triplet,
(d) repeating steps (b)–(c) until coherence of the obtained clusters no longer significantly increases, and the process concludes by annotating the clusters using nuggets of information, the nuggets including summary, breakthrough, review, keyword, citation, and reference.

The summary comprises a document in a cluster having a most typical in-link feature vector amongst all the documents in the cluster. The breakthrough comprises a document in a cluster having a most typical in-link feature vector amongst all the documents in the cluster. The review comprises a document in a cluster having a most typical out-link feature vector amongst all the documents in the cluster. The keyword comprises a word in a word dictionary for the cluster that has the largest weight. The citation comprises a document in a cluster representing a most typical in-link into a cluster. The reference comprises a document in a cluster representing a most typical out-link out of a cluster.

BRIEF DESCRIPTION OF THE DRAWINGS

The foregoing and other objects, aspects and advantages will be better understood from the following detailed description of a preferred embodiment of the invention with reference to the drawings, in which:

FIG. 3 is a chart showing the relationship between various search terms;

FIG. 4 is a chart showing the results of various search terms;

FIG. 8 is a chart illustrating the results of various search terms;

DETAILED DESCRIPTION OF PREFERRED EMBODIMENTS OF THE INVENTION

Figures 1, 2:
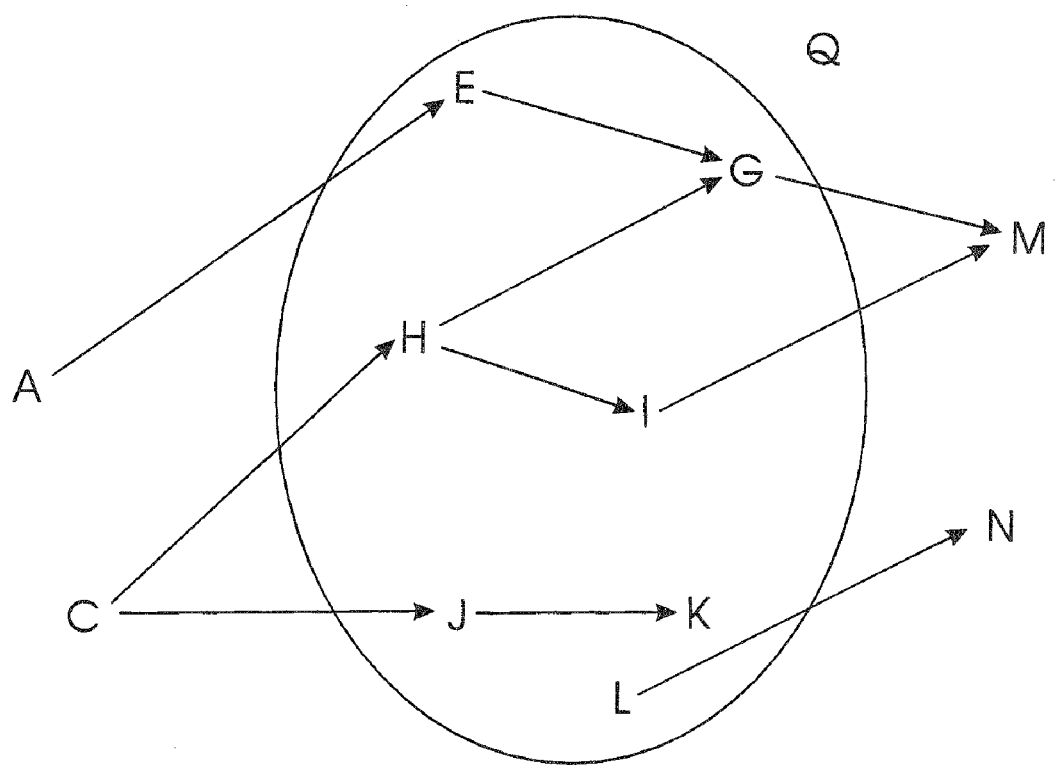
FIG. 1 is a schematic diagram illustrating the clustered sets of hypertext documents.
FIG. 2 is a chart showing the relationship between hypertext documents.

As mentioned above, there is a need for an automated system that summarizes the large volume of hypertext documents returned during internet searches. The invention clusters the set of hypertext documents that are returned by a search engine in response to a broad-topic query into various clusters such that documents within each cluster are "similar" to each other. Clustering provides a way to organize a large collection of unstructured, unlabeled hypertext documents into labeled categories that are discriminated and disambiguated from each other. The invention captures the gist of each cluster using a scheme for cluster annotation that provides useful starting points for navigating/surfing in and around each cluster.

Clustering separates unrelated documents and groups of related documents, and is useful for discrimination, disambiguation, summarization, organization, and navigation of unstructured collections of hypertext documents. The invention proposes a novel clustering process that clusters hypertext documents using words (contained in the document), out-links (from the document), and in-links (to the document). The invention automatically determines the relative importance of words, out-links, and in-links for a given collection of hypertext documents. The invention annotates each cluster using six information nuggets: summary, breakthrough, review, keywords, citation, and reference. These nuggets constitute high-quality information resources, and are extremely effective in compactly summarizing and navigating the collection of hypertext documents. The following description employs web searching as an application to illustrate its results and, as would be known by one ordinarily skilled in the art given this disclosure, the invention is not limited to web searching but instead, is equally applicable to any form of computerized searching.

Ignoring the semantic information present in various hypertext markup language (HTML) tags, a hypertext document has three different features: (i) the words contained in the document, (ii) out-links, that is, the list of hypertext documents that are pointed to or cited by the document, and (iii) the in-links, that is, the list of hypertext documents that point to or cite the document. The invention exploits all three features to cluster a collection of hypertext documents. If two documents share one or more words, the invention considers them to be semantically similar.

Extending this notion to links, if two documents share one or more out-links or in-links, the invention considers them to be similar as well. This observation is an important feature of the invention. The invention proposes a precise notion to capture the similarity between two hypertext documents along all the three features in a unified fashion. By exploiting the invention's new similarity measure, the invention proposes a geometric hypertext clustering process: the toric k-means that extends the classical Euclidean k-means process (Hartigan, J. A. *Clustering Algorithms* Wiley, 1975, incorporated herein by reference) and the spherical k-means process (Rasmussen, E. Clustering Algorithms In *Information Retrieval: Data Structures and Process* (1992), W. B. Frakes and R. Baeza-Yates, Eds., Prentice Hall, Englewood Cliffs, N.J., pp. 419–442 Dhillon, I. S., and Modha, D. S. Concept decompositions for large sparse text data using clustering Tech. Rep. Research Report RJ 10147 (95022), IBM Almaden Research Center, Jul. 8, 1999, incorporated herein by reference).

The invention annotates each cluster generated by the toric k-means process using six information nuggets: summary, breakthrough, review, keywords, citation, and reference. The summary and the keywords are derived from words, the review and the references are derived from out-links, and the breakthrough and the citations are derived from in-links. These nuggets constitute high-quality, typical information resources and are extremely effective in compactly summarizing and navigating the collection of hypertext documents.

The relative importances of the words, the out-links, and the in-links are tunable parameters in the inventions process. The invention proposes an adaptive or data-driven scheme to determine these parameters with the goal of simultaneously improving the quality of all the six information nuggets for each cluster.

The invention employs web searching as an application to illustrate the inventions results. Anecdotally, when applied to the documents returned by an internet search engine in responses to the queries latex, abduction, guinea, and abortion, the invention's process separates documents about "latex allergies" from those about "TEX&LATEX" separates documents about "alien abduction" from those about "child abduction," separates documents about "Papua New Guinea," "Guinea Bissau," and "Guinea pigs" from each other, and separates documents about "pro-life" from those about "pro-choice," respectively.

A Geometric Encoding of the Web

The Data Set. Suppose the invention is given a collection of hypertext documents, say, W. Let Q denote a subset of W. For example, W denotes the entire web, and Q denotes a small collection of hypertext documents retrieved by a conventional search engine (e.g., AltaVista-www.altavista-.com) in response to a query. The invention is interested in clustering the hypertext documents in Q. The situation of interest is depicted in FIG. 1, which only shows those documents that are at most one out- or in-link away from the documents in Q; all other link information is discarded. The words contained in hypertext documents are not shown in FIG. 1. The documents {A, C, M, N} are not in Q, but are hyperlinked to the documents in Q.

The invention extracts useful features from Q and proposes a geometric representation for these features. The invention will represent each hypertext document in Q as a triplet of unit vectors (D, F, B). These component vectors are to be thought of as column vectors. The components D, F, and B will capture the information represented by the words contained in the document, the out-links originating at the document, and the in-links terminating at the document, respectively. The method of computing these triplets for each document in Q is shown below.

Words. The creation of the first component D is a standard exercise in text mining or information retrieval (see Salton, G., and McGill, M. J. *Introduction to Modern Retrieval* McGraw-Hill Book Company, 1983, incorporated herein by reference).

The basic idea is to construct a word dictionary of all the words that appear in any of the documents in Q, and to prune or eliminate "function" words from this dictionary that do not help in semantically discriminating one cluster from another. The invention eliminated those words which appeared in less than 2 documents, standard stopwords (Frakes, W. B., and Baeza-Yates, R. *Information Retrieval: Data Structures and Process* Prentice Hall, Englewood Cliffs, N.J., 1992, incorporated herein by reference), and the HTML tags.

Suppose d unique words remain in the dictionary after such elimination. The invention assigns a unique identifier from 1 to d to each of these words. Now, for each document x in Q, the first vector D in the triplet will be a d-dimensional vector. The jth column entry, $1 \leq j \leq d$, of D is the number of occurrences of the jth word in the document x.

Out-links. The invention now outlines the creation of the second component F. The basic idea is to construct an out-link dictionary of all the hypertext documents in W that are pointed to by any of the documents in Q. The invention also adds each document in Q to the out-link dictionary. For example, in FIG. 1, the out-link dictionary is {E, G, H, I, J, K, L, M, N}.

To treat nodes in W\Q and in Q in a uniform fashion, the invention adds a self-loop from every document in Q to itself. Any document in the out-link dictionary that is not pointed to by at least two documents in Q provides no discriminating information. Hence, the invention prunes or eliminates all documents from the out-link dictionary that are pointed to by fewer than two documents (also counting the self-loops) in Q. For example, in FIG. 1, the invention eliminates the node N as it is pointed to by only L, but retain M as it is pointed to by both G and I. Similarly, the invention eliminates the nodes E, H, K, and L as they are not pointed to by any document in Q other than themselves, but retain G, I, and J as they are pointed to by at least one other document in Q and by themselves.

Suppose f unique nodes remain in the dictionary after such elimination. The invention assigns a unique identifier from 1 to f to each of these documents. Now, for each document x in Q, the second vector F in the triplet will be a f-dimensional vector. The jth column entry, $1 \leq j \leq f$, of F is the number of links to the jth retained node from the document x. FIG. 2 shows the out-link feature vectors for the example in FIG. 1.

In-links. The creation of B is similar to that of F; for completeness, the following briefly describes its construction. The basic idea is to construct an in-link dictionary of all the hypertext documents that point to any of the documents in Q. The invention also adds each document in Q to the in-link dictionary.

To treat nodes in W\Q and in Q in a uniform fashion, the invention adds a self-loop from every document in Q to itself. Any document in the in-link dictionary that does not point to at least two documents in Q provides no discriminating information. Hence, the invention prunes or eliminates all documents from the in-link dictionary that point to fewer than two documents (also counting the self-loops) in Q.

Suppose b unique nodes remain in the dictionary after such elimination. Assign an unique identifier from 1 to b to each of these documents. Now, for each document x as in Q, the third vector B in the triplet will be a b-dimensional vector. The jth column entry, $1 \leq j \leq b$, of B is the number of links from the jth retained node to the document x.

Normalization. Finally, for each document x in Q, each of the three components D, F, and B is normalized to have a unit Euclidean norm, that is, their directions are retained and their lengths are discarded.

Torus. The invention now briefly points out the geometry underlying the inventions three-fold vector space models. Suppose that the invention has n documents in Q. The invention denotes each document triplet as $$x_i = (D_i, F_i, B_i), 1 \leq i \leq n.$$

Observe that, by construction, the component vectors $D_i$, $F_i$, and $B_i$ all have unit Euclidean norm, and, hence, can be thought of as points on the unit spheres $S^a$, $S^f$, and $S^b$ in dimensions d, f, and b, respectively. Thus, each document triplet $x_i$ lies on the product space of three spheres, which is a torus (see www.treasure-troves.com/math/Torus.html). Furthermore, by construction, the individual entries of the component vectors $D_i, F_i$, and $B_i$ are nonnegative, hence, the component vectors are in fact in the nonnegative orthants of $R^d$, $R^f$, and $R^b$, respectively. For notational convenience, the invention refers to the intersection of $(S^a \times S^f \times S^b)$ with the non-negative orthant of $R^{d+f+b}$ as T.

Conventional internet search engine. The invention runs a user query through a conventional internet search engine which typically returns a list of 200 URLs containing the keywords in the query. The invention crawls and retrieves each of these 200 documents (for convenience, those documents that could not be retrieved in 1 minute were discarded), and that becomes the invention's query result document set Q. Next, the invention parses each of these documents and constructs the unpruned out-link dictionary. Finally, for each document in Q, using queries of the form "link:URL" on the conventional internet search engine, the invention retrieves the URLs of the top 20 documents that point to it. This constitutes the inventions unpruned in-link dictionary. Observe that the invention does not need the actual documents in either the out- or the in-link dictionary. The set Q and the out- and the in-link dictionaries now become the inputs for the vector space model construction procedure described above.

Statistics. In FIG. 3, for a number of queries, the invention presents statistical properties of the three-fold vector space models. A note of notation: n represent the number of documents in Q, $d^o$ and d are the number of words in the word-dictionary before and after elimination of function words, respectively, $d^\diamond$ is the average number of nonzero word counts per document, and $n_d$ is the number of documents which contain at least one word after elimination. The symbols $f^o$, f, $f^\diamond$, end $n_f$ as well as the symbols $b^o$, b, $b^\diamond$, and $n_b$ have similar meaning to their counterpart for the words. The symbols $n_f$ and $n_b$ are the number of documents in Q that are eventually retained in the final, pruned out-link and the in-link dictionaries, respectively.

High-dimensional. By observing the d, f, and b values in FIG. 3, the invention observes that, even after pruning, the word, out-link, and in-link dictionaries are found to be very high-dimensional. Also, typically, d is the much larger than both f and b.

Sparse. By observing the ratios $d^o/d$, $f^o/f$, and $b^o/b$ in Table 1, the invention observes that the vector space models are very sparse. A sparsity of 96% is typical for words, that is, on an average each document contains only 4% of the words in the word dictionary. Similarly, sparsities of 95–98% and 91–97% are typical for out- and in-links, respectively.

By observing the $n_f$ and $n_b$ values, the invention observes that not all documents have nonzero out-link and in-link features vectors. This points once again to the sparse link topology that is holding the web together. Also, the variations in $n_f$ and $n_b$ values point to the fact that some "topics" or "communities" are more tightly coupled than others.

Value of W\Q. Finally, by observing the $\hat{n}_f$ and $\hat{n}_b$ value, the invention observes that the number of nodes from the original set Q retained in the final out-link and in-link dictionaries (after pruning) is rather small. In other words, the interconnection structure of the set Q with the rest of the web, namely, W\Q, contains the vast majority of the link information in the invention's feature vectors. This justifies the invention's inclusion of links between the documents in Q and the documents W\Q.

Toric k-Means Process

A Measure of Similarity. Given document triplets x=(D, F, B) and $\tilde{x}=(\tilde{D},\tilde{F},\tilde{B})$ on the torus T, the invention defines a measure of similarity between them as a weighted sum of the inner products between the individual components. Precisely, the invention writes $$S(x,\tilde{x}) = \alpha_w D^T \tilde{D} + \alpha_f F^T \tilde{F} + \alpha_b B^T \tilde{B}, \qquad (1)$$

where weights $\alpha_w$, $\alpha_f$ and $\alpha_b$ are nonnegative numbers such that $$\alpha_w + \alpha_f + \alpha_b = 1$$

Observe that for any two document triplets x and $\tilde{x}$, $0 \leq S(x, \tilde{x}) \leq 1$. Also, observe that if the invention sets $\alpha_w=1$, $\alpha_f=0$, and $\alpha_b=0$, then the invention gets the classical cosine similarity between document vectors that has been widely used in information retrieval (Salton, et al.(1983)). The parameters $\alpha_w$, $\alpha_f$ and $\alpha_b$ are tunable in the inventions process to assign different weights to words, outlinks, and in-links as desired. The invention will later illustrate, in detail, the appropriate choice of these parameters.

Concept Triplets. Suppose the invention is given n document vector triplets $x_1, x_2, \ldots, x_n$ on the torus T. Let $\pi_1, \pi_2, \ldots, \pi_k$ denote a partitioning of these document triples into k disjoint clusters. For each fixed $1 \leq j \leq k$, the concept vector triplet or concept triplet, for short, is defined as $$c_j = (D^*_j, F^*_j, B^*_j) \qquad (3)$$

where x=(D, F, B) and $\|\cdot\|$ denotes the Euclidean norm. Observe that, by construction, each component of the concept triplet has unit Euclidean norm. The concept triplet $c_j$ has the following important property. For any triplet $\tilde{x}=(\tilde{D}, \tilde{F}, \tilde{B})$ on the torus T, the invention has from the Cauchy-Schwarz inequality that $$\sum_{x \in \pi_j} S(x, \tilde{x}) \leq \sum_{x \in \pi_j} S(x, c_j) \qquad (4)$$

In FIG. 3, n represents the number of documents in Q, $d^o$ and d are the number of words in the word-dictionary before and after elimination of function words, respectively, $d^\diamond$ is the average number of nonzero word counts per document, and $n_d$ is the number of documents which contain at least one word after elimination. The symbols $f^o, f, f^{566}$, and $n_f$ as well as the symbols $b^{566}, b, b^{566}$, and $n_b$ have a similar meaning to their counterparts for the words. The symbols $n_f$ and $n_b$ are the number of documents in Q that are eventually retained in the final, pruned out-link and the in-link dictionaries, respectively.

Thus, in an average sense, the concept triplet may be thought of as being the closest in S to all the document vector triplets in the cluster $\pi_j$. The invention demonstrates that concept triplets contain valuable conceptual or semantic information about the clusters that is important in interpretation and annotation.

The Objective Function. Motivated by (4), the invention measures the "coherence" or "quality" of each cluster $\pi_j, 1 \leq j \leq k$, as $$\sum_{x \in \pi_j} S(x, c_j)$$

If all documents in a cluster are identical, then the average coherence of that cluster will have the highest possible value of 1, while if the document vectors in a cluster vary widely, then the average coherence will be small, that is, close to 0. The invention measures the quality of any given partitioning $\pi_j, 1 \leq j \leq k$ using the following objective function:

$$\sum_{j=1}^{k} \sum_{x \in \pi_j} S(x, c_j) \qquad (5)$$

Intuitively, the objective function measures the combined coherence of all the k clusters.

The Process. The invention's objective is to find k disjoint clusters $\pi_1^\dagger, \pi_2^\dagger, \ldots, \pi_3^\dagger$ such that the following is maximized $$\{\pi_j^\dagger\}_{j=1}^{k} = \underset{\{\pi_j\}_{j=1}^{k}}{\operatorname{argmax}} \left( \sum_{j=1}^{k} \sum_{x \pi_j} S(x, c_j) \right) \qquad (6)$$

Even when only one of the parameters $\alpha_d$, $\alpha_f$, or $\alpha_b$ is nonzero, finding the optimal solution to the above maximization problem is known to be NP-complete. Discussed below is an efficient and effective approximation process: the toric k-means that may be thought of as a gradient ascent method.

Step 1. Start with an arbitrary partitioning of the document vectors, namely, $$\{\pi_j^{(0)}\}_{j=1}^{k}. \text{ Let } \{c_j^{(0)}\}_{j=1}^{k}$$

denote the concept triplets associated with the given partitioning. Set the index of iteration t=0. The choice of the initial partitioning is quite crucial to finding a "good" local minima; for recent work on this area, see (Bradley, P., and Fayyad, U. Refining initial points for k-means clustering In ICML (1998), pp. 91–99, incorporated herein by reference).

Step 2. For each document vector triplet $x_i$, 1[i]n the invention finds the concept triplet that is closest to $x_i$. Now, for 1 [j[k, compute the new partitioning $x_i, 1 \leq i \leq n$ induced by the old concept triplets $$\{c_j^{(t)}\}_{j=1}^{k}:$$

$$\pi_j^{(t+1)} = \{x \in \{x_i\}_{i=1}^{n} : S(x, c_j^{(t)}) \geq S(x, c_l^{(t)}), 1 \leq l \leq k\} \qquad (7)$$

In words, $$\pi_j^{(t+1)}$$

is the set of all document vector triplets that are closest to the concept triplet $$c_j^{(t)}.$$

If it happens that some document triplet is simultaneously closest to more than one concept triplet, then it is randomly assigned to one of the clusters.

Step 3. Compute the new concept triplets $$\{c_j^{(t+1)}\}_{j=1}^k$$

corresponding to the partitioning computed in equation (7) by using (2)–(3) where instead of $\pi_j$ The invention uses $$\pi_j^{(t+1)}.$$

Step 4. If some "stopping criterion" is met, then set $$\pi_j^\dagger = \pi_j^{(t+1)}$$

and set $$c_j^\dagger = c_j^{(t+1)}$$

for $1 \leq j \leq k$, and exit. Otherwise, increment t by 1, and go to step 2 above. An example of a stopping criterion is: Stop if the change in the objective function, between two successive iterations, is less than some specified threshold.

Shape of Clusters. Clusters defined using equation (7) are known as Voronoi or Dirichlet partitions. The boundary between two clusters, say, $\pi_j^\dagger$ and $\pi_l^\dagger$ is the locus of all document triplets x on T satisfying:

$$S(x, c_j^\dagger) = S(x, c_l^\dagger).$$

If only one of the parameters $\alpha_d$, $\alpha_f$, or $\alpha_b$ is nonzero, then the above locus is a hypercircle on the corresponding sphere; when more than one parameters is nonzero, the locus is a hyperellipsoid. Thus, each cluster is a region on the surface of the underlying torus is bounded by hyperellipsoids. In conclusion, the geometry of the torus plays an integral role in determining the "shape" and the "structure" of the clusters found by the toric k-means process.

Cluster Annotation and Interpretation.

Suppose the invention has clustered a hypertext collection Q into k clusters $$\{\pi_j^\dagger\}_{j=1}^k \ ; \text{let} \ \{c_j^\dagger\}_{j=1}^k$$

denote the corresponding concept triplets. In this raw form, the clustering is of little use. The invention now uses the concept triplets to interpret and annotate each cluster. The process of seeking good cluster annotation will motivate the choice of the weights $\alpha_d$, $\alpha_f$, or $\alpha_b$.

The invention fixes a cluster $\pi_j^\dagger, 1 \leq j \leq k$. Let $c_j^\dagger = (D^*_j, F^*_j, B^*_j)$ denote the corresponding concept triplet. The following shows how to label the fixed cluster $\pi_j^\dagger$ using six different nuggets of information.

Summary. A summary is a document in $\pi_j^\dagger \subset Q$ that has the most typical in-link feature vector amongst all the documents in the cluster. Formally, the summary is a document triplet x=(D, F, B) whose word component D is closest in cosine similarity to $D^*_j$;

Breakthrough. A breakthrough is a document in $\pi_j^\dagger \subset Q$ that has the most typical in-link feature vector amongst all the documents in the cluster. Formally, the breakthrough is a document triplet x=(D, F, B) whose in-link component B is closest in cosine similarity to $B^*_j$.

Review. A review is a document in $\pi_j^\dagger \subset Q$ that has the most typical out-link feature vector amongst all the documents in the cluster. Formally, the review is a document triplet x=(D, F, B) whose out-link component F is closest in cosine similarity to $F^*_j$.

Keywords. Keywords for the cluster $\pi_j^\dagger$ are those words in the word dictionary that have the largest weight in $D^*_j$ compared to their respective weights in $D^*_l$, $1 \leq l \leq k$, $l \neq j$. Keywords are the most discriminating words in a cluster and constitute an easy-to-interpret cluster signature.

Citations. Citations for the cluster $\pi_j^\dagger$ are those in-links in the in-link dictionary that have the largest weight in $B^*_j$ compared to their respective weights in $B^*_l$, $1 \leq l \leq k$, $l \neq j$. Citations represent the set of most typical links entering (the documents in) the given cluster.

References. References for the cluster $\pi_j^\dagger$ are those out-links in the out-link dictionary that have the largest weight in $F^*_j$ compared to their respective weights in $F^*_l$, $1 \leq l \leq k$, $l \neq j$. References represent the set of most typical links exiting (from the documents in) the given cluster.

If the invention were to cluster a collection of not-hyperlinked text documents, then the summary and the keywords would constitute an adequate annotation. For hypertext collections, the inventions annotation naturally extends the concepts of summary and the keywords from words to in-links and out-links as well. The names of the six nuggets have been inspired by their respective analogues in the scientific literature. Observe that the summary, the breakthrough, and the review are meant to be primarily descriptive of the contents of the cluster, whereas the keywords, the references, and the citations are meant to be discriminative characteristics of the cluster. Also, observe that the summary, the breakthrough, and the review are, by definition, drawn from the set Q; however, the citations and the references may or may not be in the set Q.

Effectiveness of Annotation: Examples. Suppose, for a moment, that the invention is not interested in clustering at all; in other words, suppose that the invention is interested in only one cluster, that is, k=1. Even in this case, the six nuggets described above are meaningful, and often capture the top information resources present in Q.

For example, in FIG. 4, by treating the entire set Q as one cluster, the invention presents the six nuggets for each of the four queries: virus, "human rights," dilbert, and terrorism. As even a casual glance reveals, the annotation indeed captures the top information resources in every case and provides a valuable starting point for navigating the documents surrounding the cluster. By treating the entire set Q as one cluster, we present the corresponding six nuggets for each of the four queries: virus, "human rights", dilbert, and terrorism. Every document that is in Q is followed by a number in the parentheses that represents its rank in the documents returned by AltaVista. Every summary, review, and breakthrough is always followed by a parenthetic number, whereas the references or citations are followed by a parenthetic number only when applicable.

Furthermore, note that, in FIG. 4, every document that is in Q is followed by parenthetic number that represents its rank in the documents returned by conventional internet search engine. For example, for the query "virus" the summary is "Anti-Virus Tools (51)" meaning that it was the fifty-first document returned by a conventional internet search engine. By observing these parenthetic numbers, the invention can conclude that, in almost every case, the top resources found by the invention's annotation were not amongst the top documents returned by the conventional internet search engine. For example, for the query "human rights," the inventions annotation finds the "United Nations Human Rights Website" as a breakthrough, while it is the twenty-second document returned by conventional internet search engine. Thus, in its simplest form, the inventions annotation provides a rearrangement of the results returned by the conventional internet search engines. Such rearrangements are important, since user studies have shown that the users rarely go beyond the top 20 documents returned by an information retrieval system (Silverstein, C., Henzinger, M., Marais, J., and Moricz, M. Analysis of a very large AltaVista query log. Tech. Rep. 1998–014, Compaq Systems Research Center, Palo Alto, Calif., October 1998., incorporated herein by reference).

Choice of the Weights

In the end, it is really the annotation of each cluster in terms of the above six nuggets that is presented to the end user.

As shown in FIG. 4, by treating the entire set Q as one cluster, the invention presents the corresponding six nuggets for each of the four Queries: virus, "human rights," dilbert, and terrorism. Every document that is in Q is followed by a number in the parentheses that represents its rank in the documents returned by conventional internet search engine. Every summary, review, and breakthrough is always followed by a parenthetic number, whereas the references or citations are followed by a parenthetic number only when applicable.

Hence, arguably, a natural goal of hypertext clustering is to obtain the most descriptive and discriminative nuggets possible. Clearly, if the invention uses $\alpha_d=1$, $\alpha_f=0$, and $\alpha_b=0$, then the invention gets a good discrimination amongst the resulting clusters in the feature space constituted by the words. Consequently, the invention obtains good summary and keywords for the resulting clusters. Similarly, if the invention uses $\alpha_d=0, \alpha_f=1$, and $\alpha_b=0$, then the invention can obtain good review and references for the resulting clusters. Finally, if the invention uses $\alpha_d=0,\alpha_f=0$, and $\alpha_b=1$, then the invention can obtain good breakthrough and citations for the resulting clusters. To truly and completely exploit the hypertext nature of the given document collection, the invention would like all the six nuggets to be of good quality simultaneously. This can be achieved by judiciously selecting the parameters $\alpha_d$, $\alpha_f$, and $\alpha_b$. The invention now provides a formal framework for this choice.

Figures 5, 6, 7:
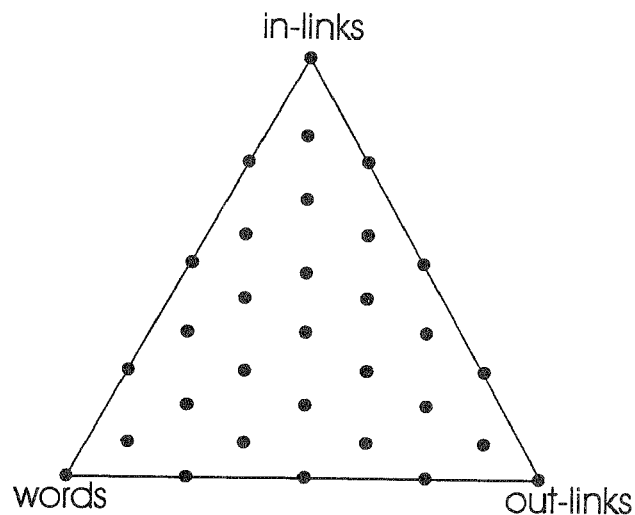
FIG. 5 is a schematic diagram illustrating the relationship between words, in-links, and out-links.
FIG. 6 is a chart illustrating various parameter tuples.
FIG. 7 is a chart illustrating results of a query.

Throughout this section, the invention fixes the number of clusters $k \geq 2$. As before, let $\alpha_d$, $\alpha_f$ and $\alpha_b$ be nonnegative numbers that sum to 1. Geometrically, these parameters lie on a planar triangular region, say, $\Delta o$, that is shown in FIG. 5. For brevity, the invention writes $\alpha=(\alpha_d, \alpha_f, \alpha_b)$. Let $\Pi(\alpha)=\{\pi_j^{554}\}_{j=1}^k$, denote the partitioning obtained by running the toric k-means process with the parameter values $\alpha_d$, $\alpha_f$, and $\alpha_b$. From the set of all possible clusterings $\{\Pi(a): a\in\Delta_o\}$. The invention selects a partitioning that yields the best cluster annotations. Towards this goal, the invention introduces a figure-of-merit for evaluating and comparing various clusterings.

Fixing a clustering $\Pi(\alpha)$. For the given clustering, the summary, which is a descriptive characteristic, for each of the clusters will be good if each cluster is as coherent as possible in the word feature space, that is, if the following is maximized:

$$\Gamma_d(\alpha) \equiv \Gamma_d(\Pi(\alpha)) = \sum_{j=1}^k \sum_{X\in\pi_j} D^T D_j^*$$

where x=(D, F, B). Furthermore, the keywords, which are a discriminative characteristics, will be good if the following is minimized:

$$\Lambda_d(\alpha) \equiv \Lambda_d(\Pi(\alpha)) = \sum_{j=1}^k \sum_{X\in\pi_j} \sum_{l=1, l\neq j}^k D_j^T D_l^*,$$

where x=(D, F, B). Intuitively, $\Gamma_d(\alpha)$ and $\Lambda_d(\alpha)$ capture the average within cluster coherence and average between cluster coherence, respectively, of the clustering $\Pi(\alpha)$ in the word feature space. The summary and the keywords both will be good if the following ratio is maximized:

$$Qd(a) \equiv Q_d(\Pi(a)) = \begin{cases} \left(\frac{\Gamma_d(a)}{\Lambda_{d(a)}}\right)^{nd/n} & \text{if } \Lambda_d(\alpha) > 0, \\ 1 & \text{if } \Lambda_d(\alpha) = 0, \end{cases} \quad (8)$$

where nd denotes the number of document triplets in Q that have a non-zero word feature vector; see, for example, FIG. 3. In the case that $\Lambda_d(\alpha)=0$, the clusters are perfectly separated in the word feature space.

The quantities $\Gamma_f(\alpha)$, $\Lambda_f(\alpha)$, $\Gamma_b(\alpha)$, $\Lambda_b(\alpha)$, $Q_f(\alpha)$, and $Q_b(\alpha)$ are defined in a similar fashion. The quantity $Q_f(\alpha)$ should be maximized to obtain good quality review and references, and the Quantity $Q_b(\alpha)$ should be maximized to obtain good quality breakthrough and citations.

In FIG. 5 the triangular region $\Delta_o$ is formed by the intersection of the plane $\alpha_d+\alpha_f+\alpha_b=1$ with the nonnegative orthant of $R^3$. The left-vertex, the right-vertex, and the top-vertex of the triangle correspond to the points (1, 0, 0), (0, 1, 0), and (0, 0, 1), respectively.

The following shows how the invention selects the optimal parameter tuple $\alpha^\dagger$ and the corresponding clustering $\Pi(\alpha^\dagger)$.

Step 1. Theoretically, the invention would like to run the tortic k-means process for every parameter triplet in:

$$\Delta_0=\{\alpha:\alpha_d+\alpha_f+\alpha_b=1,\alpha_d,\alpha_f,\alpha_b\geq 0\}. \quad (9)$$

In practice, the invention replaces the region $\Delta_o$ in equation (9) by a finite number of points on a discrete grid that are graphically shown using the symbol in FIG. 5.

Step 2. To obtain good cluster annotations in terms of all the six nuggets, the invention simultaneously maximizes $Q_d$, $Q_f$, and $Q_b$. Hence, the invention selects the parameters $a^{\dagger}$ as the solution of the following maximization problem:

$$a^\dagger = \underset{a\in\Delta}{\operatorname{argmax}}[Q_d(a) \times Q_f(a) \times Q_b(a)] \quad (10)$$

where the invention defines the region $\Delta$. First, the invention needs some notation.

$R_d=\{\alpha\in\Delta_o:\Lambda_d(\alpha)=0\}$
$R_f=\{\alpha\in\Delta_o:\Lambda_f(\alpha)=0\}$
$R_b=\{\alpha\in\Delta_o:\Lambda_b(\alpha)=0\}$ $\Delta_3 = R_d \cap R_f \cap R_b$ $\Delta_2 = ((R_d \cap R_f) \cup (R_d \cap R_b) \cup (R_f \cap R_b)) \setminus \Delta_3$ $\Delta_1 = (R_d \cap R_f \cap R_b) \setminus \Delta_2$ The invention now defines the region $\Delta$ as follows:

$$\Delta = \begin{cases} \Delta_3 & \text{if } \Delta_3 \neq \phi \\ \Delta_2 & \text{elseif } \Delta_2 \neq \phi \\ \Delta_1 & \text{elseif } \Delta_1 \neq \phi \\ \Delta_0 & \text{otherwise.} \end{cases}$$

The following explains the reasoning behind the above definitions. The regions $R_d$, $R_f$, and $R_b$ denote the set of parameters for which the corresponding clusterings perfectly separate the document triplets in the word, out-link, and in-link feature spaces, respectively. The region $\Delta$ denotes the set of parameters for which the corresponding clusterings perfectly separate the document triplets in all the three feature spaces. Clearly, if such clusterings are available, that is, if $\Delta$ is not empty, then the invention would prefer them. Hence, the invention sets $\Delta = \Delta_3$, if $\Delta_3 \neq \emptyset$. The region $\Delta_2$ denotes the set of parameters for which the corresponding clusterings perfectly separate the document triplets along two, but not all three, feature spaces. In the case that $\Delta_3$ is empty, the invention prefers clusterings in $\Delta_2$. Now, the region $\Delta_1$ denotes the set of parameters for which the corresponding clusterings perfectly separate the document triplets along one and only one of the three feature spaces. In the case that $\Delta_3$ and $\Delta_2$ are both empty, the invention prefers the clusterings in $\Delta_1$. Finally, $\Delta_0$ which is the entire triangular region in FIG. 5 is the default choice when $\Delta_3$, $\Delta_2$, and $\Delta_1$ are all empty. In practice, the invention has found that $\Delta_3$ and $\Delta_2$ are usually empty, and, hence, for most data sets, the invention expects the region $\Delta$ to be either $\Delta_1$ or $\Delta_0$.

Step 3. Having selected the parameter triple $\alpha^\dagger$ let the optimum clustering $\Pi(\alpha^\dagger)$ denote the partitioning obtained by running the torte k-means process with $\alpha^\dagger$.

To illustrate the above scheme, the invention now utilizes the $Q_d$, $Q_f$, $Q_b$, and $T = Q_d \times Q_f \times Q_b$ values for various parameter tuples, where Q is the set of documents returned by a conventional internet search engine in response to the query guinea and k=3, as shown in FIG. 6.

The first, second, and the third rows correspond to clustering primarily along words, out-links, and in-links, respectively, while the fourth row corresponds to the clustering corresponding to the optimal parameter tuple. It can be seen that the optimal clustering achieves significantly larger T value than clusterings which cluster only along one of the three features. In practice, the larger T value often translates into superior cluster annotation.

RESULTS

In FIG. 7, the invention summarizes the results obtained by solving the maximization problem in equation (10) for each of the four queries: latex, abduction, guinea, and abortion. The set of documents returned by AltaVista for each of the four queries: latex, abduction, guinea, and abortion are clustered into k clusters. For each query, the optimal parameter tuple at: $\alpha^\dagger$ is determined by solving the minimization problem in (10). For queries abduction and guinea, all the three sets $\Delta_3$, $\Delta_2$, and $\Delta_1$ turn out to be empty, and, hence, $\Delta = \Delta_0$. For queries latex and abortion, the two sets $\Delta_3$ and $\Delta_2$ turn out to be empty, but the set $\Delta_1$ is not empty, and, hence, $\Delta = \Delta_1$.

In FIG. 8, the invention presents the optimal clusterings corresponding to the optimal parameter triplets in FIG. 7 for the queries latex, abduction, guinea, and abortion. By running the toric k-means algorithm with the respective optimal parameter tuples in FIG. 7, the set of documents Q returned by AltaVista is clustered in response to the queries latex, abduction, guinea, and abortion into k=2, 2, 3, and 3 clusters, respectively. The six nuggets are shown for each cluster. Every document that is in Q is followed by a number in the parentheses that represents its rank in the documents returned by AltaVista. Every summary, review, and breakthrough is always followed by a parenthetic number, whereas the references or citations are followed by a parenthetic number only when applicable.

It can be seen from FIG. 8 that (i) the set of documents corresponding to latex is neatly partitioned into "latex allergies" cluster and into "$T_EX$ & $L^{AT}_EX$" cluster; (ii) the set of documents corresponding to abduction is neatly partitioned into "alien abduction" cluster and into "child abduction" cluster; (iii) the set of documents corresponding to guinea is neatly partitioned into "Papua New Guinea," "Guinea Bissau," and "Guinea pigs" clusters; and, finally, (iv) the set of documents corresponding to abortion is neatly partitioned into two "pro-life" cluster and one "pro-choice" clusters.

Figure 10:
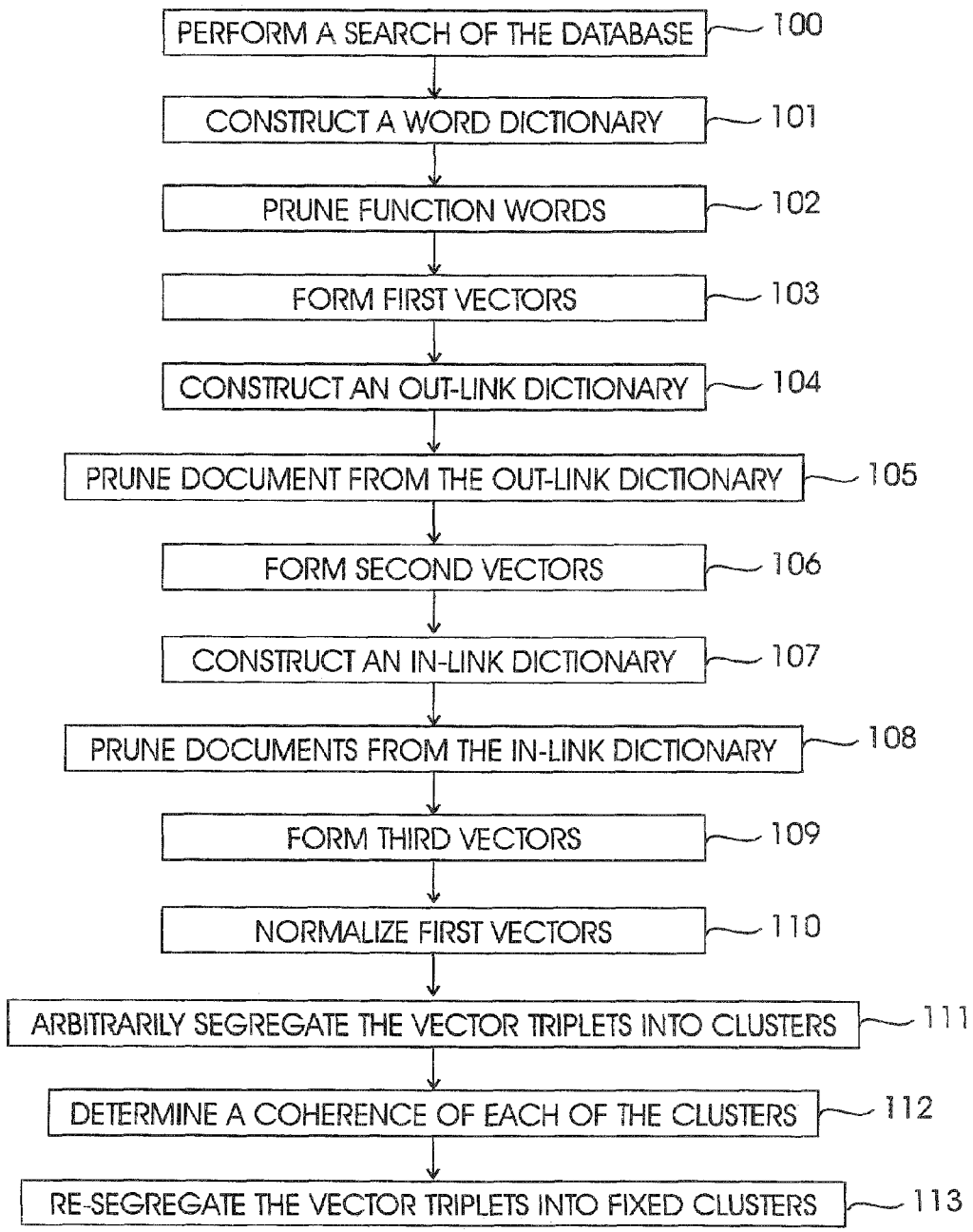
FIG. 10 is a flowchart representation of one embodiment of the invention.

In FIG. 10 the invention performs a search of the database 100, constructs a word dictionary 101, prunes function words 102, forms first vectors 103, constructs an out-link dictionary 104, prunes documents from the out-link dictionary 105, forms second vectors 106, constructs an in-link dictionary 107, prunes documents form the in-link dictionary 108, forms third vectors 103, normalizes the first vectors 110, arbitrarily segregates the vector triplets into clusters 111, determines a coherence of each of the clusters 112, and re-segregates the vector triplets into fixed clusters 113.

Figure 9:
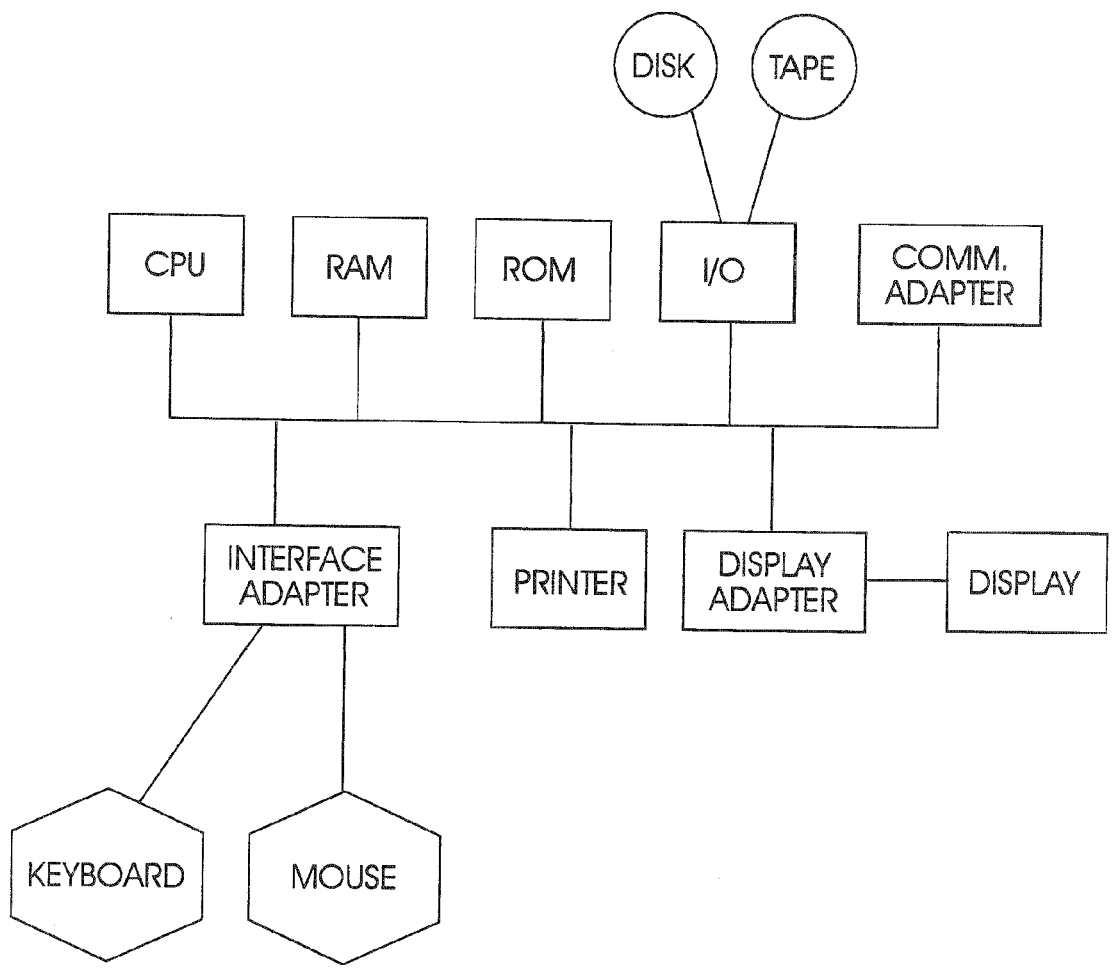
FIG. 9 is a schematic diagram illustrating a hardware embodiment of the invention.

While the overall methodology of the invention is described above, the invention can be embodied in any number of different types of systems and executed in any number of different ways, as would be known by one ordinarily skilled in the art. For example, as illustrated in FIG. 9, a typical hardware configuration of an information handling/computer system in accordance with the invention preferably has at least one processor or central processing unit (CPU) 900. For example, the central processing unit 900 could include various image/texture processing units, mapping units, weighting units, classification units, clustering units, filters, adders, subtractors, comparators, etc. Alternatively, as would be known by one ordinarily skilled in the art given this disclosure, multiple specialized CPU's (or other similar individual functional units) could perform the same processing, mapping, weighting, classifying, clustering, filtering, adding, subtracting, comparing, etc.

The CPU 900 is interconnected via a system bus 901 to a random access memory (RAM) 902, read-only memory (ROM) 903, input/output (I/O) adapter 904 (for connecting peripheral devices such as disk units 905 and tape drives 906 to the bus 901), communication adapter 907 (for connecting an information handling system to a data processing network) user interface adapter 908 (for connecting a peripherals 909–911 such as a keyboard, mouse, imager, microphone, speaker and/or other interface device to the bus 901), a printer 912, and display adapter 913 (for connecting the bus 901 to a display device 914). The invention could be implemented using the structure shown in FIG. 9 by including the inventive method, described above, within a computer program stored on the storage device 905. Such a computer program would act on an image supplied through the interface units 909–911 or through the network connection 907. The system would then automatically segment the textures and output the same on the display 914, through the printer 912 or back to the network 907.

Document clustering using only textual features such as words or phrases has been extensively studied; for a detailed review of various k-means type processes, graph theoretical processes, and hierarchical agglomerative clustering processes, see Rasmussen, E. Clustering Algorithms. In Information Retrieval: Data Structures and Algorithms (1992), W. B. Frakes and R. Baeza-Yates, Eds., Prentice Hall, Englewood Cliffs, N.J., pp. 419–442, and Willet, P., Recent trends in hierarchic document clustering: a critical review. Inform. Proc. & Management (1988), pp. 577–597, incorporated herein by reference.

By treating the references made by one scientific paper (or a patent or a law case) to another as a logical hyperlink, one can interpret scientific literature (or patents or law cases) as a hypertext document collection. Citation analysis was developed as a tool to identify core sets or clusters of articles, authors, or journals of particular fields of study by using the logical hyperlinks between scientific papers, see White, H. D., and McCain, K. W., Bibliometrics, Annual Review of Information Science and Technology 24 (1989), pp. 119–186, and Small H., Co-citation in the scientific literature: A new measure of the relationship between two documents. J. Amer. Soc. Inform. Sci. (1973), pp. 265–269, incorporated herein by reference. Larson, R., Bibliometric of the world wide web: An exploratory analysis of the intellectual structure of cyberspace, In annual Meeting Amer. Soc. Info. Sci. (1996), incorporated herein by reference, has proposed using citation analysis with multidimensional scaling to identify clusters in the web. Recently, Kleinberg, supra, has extended citation analysis to web searching. In response to a topic Query, HITS produces two distinct but interrelated types of pages: authorities (highly-cited pages) and hubs (pages that cite many authorities). HITS only uses the link topology; CLEVER refines HITS to include key word matches within anchor text, Chakrabarti, S., Dom, B. E., Raghavan, P., Rajagopalan, S., Gibson, D., and Kleinberg, J., Automatic resource compilation by analyzing hyperlink structure and associated text, In WWW7 (1998), incorporated herein by reference. For a highly accessible treatment of use of citation analysis in web searching, see Chakrabarti., S., Dom, B. E., Kumar, S. R., Raghayan, P., Rajagopalan, S., Tomkins, A., Kleinberg, J. M., and Gibson, D., Hypersearching the web., Scientific American (June 1999), incorporated herein by reference. The invention's method differs from citation analysis in that in Furthermore, this body of work has not focused on hypertext clustering which is the problem of interest.

Botafogo, R. A., Cluster analysis for hypertext systems, in ACM SIGIR (1993), incorporated herein by reference, has proposed a graph-based process for clustering hypertext that uses link information but no textual information; he proposed the number of independent paths between nodes as a measure of similarity. MukherJea, S., Foley, J. D., and Hudson, S. E., Interactive clustering for navigating in hypermedia systems, In ACM Hypertext (1994), incorporated herein by reference, have proposed using content- and structure-based processes for interactive clustering of hypertext. In their model, the user precisely specifies her information need, for example, all nodes containing some content or all graphical substructures, and, hence, unlike the present invention, theirs is not an automated clustering methodology.

Weiss, R., Velez, B., Sheldon, M. A., Namprempre, C. Szilagyi, P., Duda, A., and Gifford, D. K., Hypursuit: A hierarchical network search engine that exploits content-link hypertext clustering, in ACM Hypertext (1996), incorporated herein by reference, combined information about document contents and hyperlink structures to automatically cluster hypertext documents. The invention is distinct in the choice of the processes, the underlying similarity metrics, and the cluster naming or annotation scheme. In particular, Weiss et al, supra, uses the complete link process, while the invention develops a variant of the k-means organization of information and for browsing and searching. Their results are complementary to the inventions.

While the invention has been described in terms of preferred embodiments, those skilled in the art will recognize that the invention can be practiced with modification within the spirit and scope of the appended claims.

What is claimed is:

1. A method of searching a database of documents, said method comprising:

performing a search of said database using a query to produce query result documents;

constructing a word dictionary of words within said query result documents;

constructing an out-link dictionary of documents within said database that are pointed to by said query result documents;

adding said query result documents to said out-link dictionary;

constructing an in-link dictionary of documents within said database that point to said query result documents; and adding said query result documents to said in-link dictionary.

2. The method in claim 1, further comprising:

forming first vectors for words remaining in said word dictionary;

forming second vectors for documents remaining in said out-link dictionary;

forming third vectors for documents remaining in said in-link dictionary;

normalizing said first vectors, said second vectors, and said third vectors to create vector triplets for document remaining in said in-link dictionary and said out-link dictionary; and clustering the said vector triplets into one of clusters, or classes and partitions.

3. The method in claim 2, wherein said clustering comprises a four toric k-means process comprising:

arbitrarily segregating the vector triplets into clusters;

for each cluster, computing a set of concept triplets describing said cluster;

re-segregating said vector triplets into a more coherent set of clusters by putting each vector triplet into a cluster corresponding to a concept triplet that is most similar to, a given vector triplet;

determining a coherence for each of said clusters based on a similarity of vector triplets within each of said clusters, and repeating the computing and re-segregating steps until coherence of the obtained clusters no longer significantly increases.

4. The method in claim 2, further comprising annotating and summarizing said clusters using nuggets of information, said nuggets including summary, breakthrough, review, keyword, citation, and reference.

5. The method in claim 4, wherein said summary comprises a document in a cluster having a most typical in-link feature vector amongst all the documents in said cluster.

6. The method in claim 4, wherein said breakthrough comprises a document in a cluster having a most typical in-link feature vector amongst all the documents in said cluster.

7. The method in claim 4, wherein said review comprises a document in a cluster having a most typical out-link feature vector amongst all the documents in said cluster.

8. The method in claim 4, wherein said keyword comprises a word in said word dictionary for said cluster that has the largest weight.

9. The method in claim 4, wherein said citation comprises a document in a cluster representing a most typical in-link into said cluster.

10. The method in claim 4, wherein said reference comprises a document in a cluster representing a most typical out-link out of said cluster.

11. The method in claim 1, further comprising pruning function words from said word dictionary.

12. The method in claim 1, further comprising pruning documents from said out-link dictionary that are pointed to by fewer than a first predetermined number of said query result documents.

13. The method in claim 1, further comprising pruning documents from said in-link dictionary that point to fewer than a second predetermined number of said query result documents.

14. A program storage device readable by computer, tangibly embodying a program of instructions executable by said computer to perform a method of searching a database of documents, said method comprising:
   performing a search of said database using a query to produce query result documents;
   constructing a word dictionary of words within said query result documents;
   constructing an out-link dictionary of documents within said database that are pointed to by said query result documents;
   adding said query result documents to said out-link dictionary;
   constructing an in-link dictionary of documents within said database that point to said query result documents; and
   adding said query result documents to said in-link dictionary.

15. The program storage device in claim 14, wherein said method further comprises:
   forming first vectors for words remaining in said word dictionary;
   forming second vectors for documents remaining in said out-link dictionary;
   forming third vectors for documents remaining in said in-link dictionary;
   normalizing said first vectors, said second vectors, and said third vectors to create vector triplets for document remaining in said in-link dictionary and said out-link dictionary; and
   clustering the said vector triplets into one of clusters, or classes and partitions.

16. The program storage device in claim 15, wherein in said method, said clustering comprises a four toric k-means process comprising:
   arbitrarily segregating the vector triplets into clusters;
   for each cluster, computing a set of concept triplets describing said cluster;
   re-segregating said vector triplets into a more coherent set of clusters by putting each vector triplet into a cluster corresponding to a concept triplet that is most similar to, a given vector triplet;
   determining a coherence for each of said clusters based on a similarity of vector triplets within each of said clusters, and repeating the computing and re-segregating steps until coherence of the obtained clusters no longer significantly increases.

17. The program storage device in claim 15, wherein said method further comprises annotating and summarizing said clusters using nuggets of information, said nuggets including summary, breakthrough, review, keyword, citation, and reference.

18. The program storage device in claim 17, wherein said summary comprises a document in a cluster having a most typical in-link feature vector amongst all the documents in said cluster, wherein said breakthrough comprises a document in a cluster having a most typical in-link feature vector amongst all the documents in said cluster, wherein said review comprises a document in a cluster having a most typical out-link feature vector amongst all the documents in said cluster, wherein said keyword comprises a word in said word dictionary for said cluster that has the largest weight, wherein said citation comprises a document in a cluster representing a most typical in-link info said cluster, and wherein said reference comprises a document in a cluster representing a most typical out-link out of said cluster.

19. The program storage device in claim 14, wherein said method further comprises:
   pruning function words from said word dictionary;
   pruning documents from said out-link dictionary that are pointed to by fewer than a first predetermined number of said query result documents; and
   pruning documents from said in-link dictionary that point to fewer than a second predetermined number of said query result documents.

20. A system for searching a database of documents, said system comprising:
   means for performing a search of said database using a query to produce query result documents;
   means for constructing a word dictionary of words within said query result documents;
   means for constructing an out-link dictionary of documents within said database that are pointed to by said query result documents;
   means for adding said query result documents to said out-link dictionary;
   means for constructing an in-link dictionary of documents within said database that point to said query result documents; and
   means for adding said query result documents to said in-link dictionary.

* * * * *